US008292216B1

(12) United States Patent
Rumberger, Jr.

(10) Patent No.: US 8,292,216 B1
(45) Date of Patent: Oct. 23, 2012

(54) WING LIFT SYSTEM

(75) Inventor: William Elmer Rumberger, Jr., Newtown Square, PA (US)

(73) Assignee: The Boeing Company, Chicago, IL (US)

( * ) Notice: Subject to any disclaimer, the term of this patent is extended or adjusted under 35 U.S.C. 154(b) by 563 days.

(21) Appl. No.: 12/639,505

(22) Filed: Dec. 16, 2009

(51) Int. Cl.
*B64C 27/00* (2006.01)
(52) U.S. Cl. ................ 244/39; 244/49; 244/46
(58) Field of Classification Search ............ 244/56, 244/99.2, 99.5, 99.6, 39, 6, 7 R, 7 A, 7 C, 244/17.11, 17.23, 17.25, 46, 49
See application file for complete search history.

(56) References Cited

U.S. PATENT DOCUMENTS

| | | | | |
|---|---|---|---|---|
| 5,337,974 | A * | 8/1994 | Rumberger et al. | 244/49 |
| 5,860,624 | A * | 1/1999 | Obry et al. | 244/39 |
| 7,665,688 | B2 * | 2/2010 | Cylinder et al. | 244/7 A |
| 2009/0095838 | A1 * | 4/2009 | Gerbino | 244/39 |

* cited by examiner

*Primary Examiner* — Christopher P Ellis
*Assistant Examiner* — Medhat Badawi
(74) *Attorney, Agent, or Firm* — Yee & Associates, P.C.

(57) ABSTRACT

A method and apparatus may be present for moving a wing. A plurality of lifting assemblies may be attached to a first plurality of channels in a ring associated with the wing of an aircraft. A plurality of base assemblies may be attached to a plurality of fittings with a second plurality of channels associated with a fuselage of the aircraft. The plurality of lifting assemblies may be moved away from the plurality of base assemblies using a plurality of biasing systems such that the ring may move away from the fuselage.

18 Claims, 17 Drawing Sheets

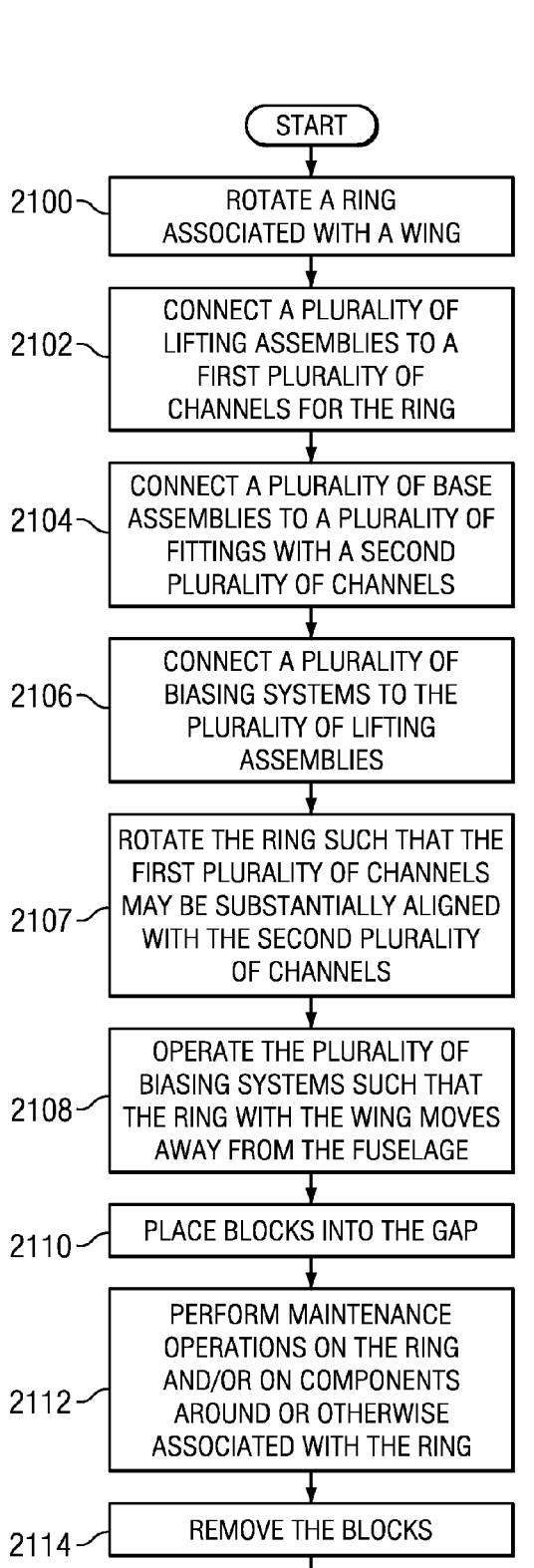
FIG. 21
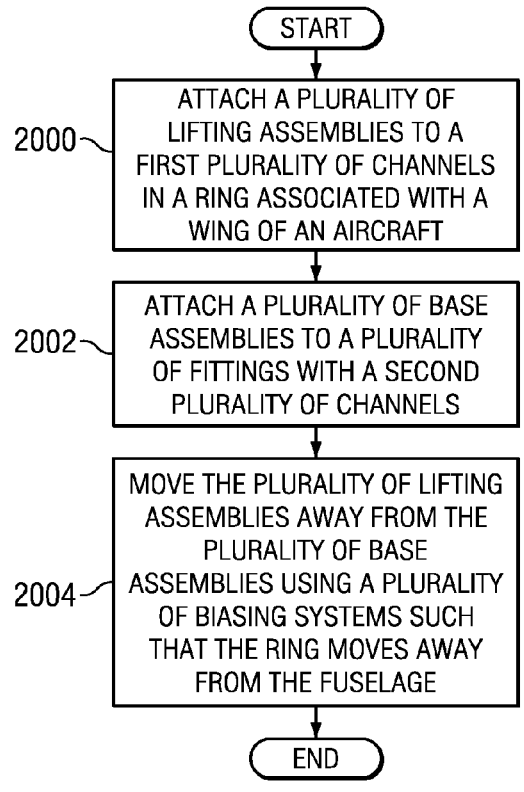
FIG. 20
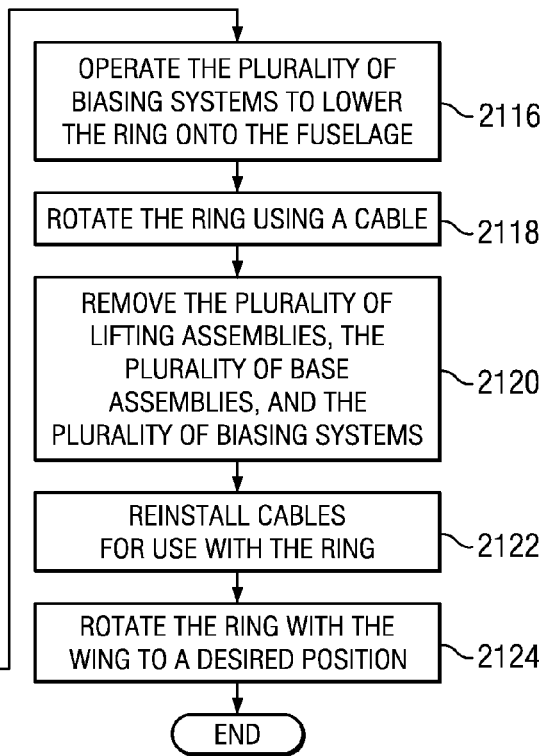

WING LIFT SYSTEM

GOVERNMENT LICENSE RIGHTS

This application was made with Government support under contract number N00019-09-0008 awarded by the United States Navy. The Government has certain rights in this application.

BACKGROUND INFORMATION

1. Field

The present disclosure relates generally to aircraft and, in particular, to non-fixed wing aircraft. Still more particularly, the present disclosure relates to a method and apparatus for lifting a wing for a non-fixed wing aircraft.

2. Background

Aircraft may take many different forms. For example, without limitation, aircraft may take the form of a fixed or non-fixed wing aircraft or a helicopter. A fixed wing aircraft also may be referred to as an airplane. Fixed wing aircraft typically may require more room to take off and land, as compared to a helicopter.

Some aircraft may provide for vertical takeoff and landing. For example, without limitation, a Harrier jump jet may be an example of a jet-powered aircraft that may perform vertical takeoffs and landings.

Another example may be a tilt-rotor aircraft. The rotors may move between a substantially horizontal position and a substantially vertical position. Still another example may be a tilt-wing aircraft.

In this manner, these types of aircraft may provide more flexibility, as compared to regular aircraft. For example, without limitation, with a vertical takeoff and landing capability, a tilt-rotor aircraft may require less room to take off and land, as compared to a normal fixed wing aircraft. Additionally, a tilt-rotor aircraft may provide longer ranges and higher speeds, as compared to a conventional helicopter.

Further, some tilt-rotor aircraft may be configured such that the wing is fixed during flight but may be rotated in non-flight conditions. For example, without limitation, the wing may be rotated to be substantially parallel with the fuselage of the aircraft. In this manner, less room may be required to store and transport this type of aircraft. With this type of capability, a tilt-rotor aircraft may be used on ships, such as aircraft carriers.

With these types of features, the association of the wing with the fuselage in a manner that allows for rotation may increase the complexity of the aircraft. This increased complexity may require increased maintenance and may take the aircraft out of service for longer time than desired.

Therefore, it would be advantageous to have a method and apparatus that takes into account at least one of the issues discussed above, as well as possibly other issues.

SUMMARY

In one advantageous embodiment, an apparatus may comprise a plurality of lifting assemblies, a plurality of base assemblies, and a plurality of biasing systems. The plurality of lifting assemblies may be configured to be attached to a first plurality of channels in a ring associated with a wing of an aircraft. The plurality of base assemblies may be configured to be attached to a plurality of fittings with a second plurality of channels associated with a fuselage of the aircraft. The plurality of biasing systems may be configured to move the plurality of lifting assemblies away from the plurality of base assemblies such that the ring moves away from the fuselage.

In another advantageous embodiment, a lifting system to lift a rotatable wing away from a fuselage of an aircraft may comprise a plurality of lifting assemblies, a plurality of base assemblies, a plurality of hydraulic lift units, a hydraulic pump, a plurality of measurement units, and a locking system. The plurality of lifting assemblies may be configured to be attached to a first plurality of channels in a ring associated with a rotatable wing of the aircraft. A lifting assembly in the plurality of lifting assemblies may comprise a lifting bracket having a member configured to extend through a channel in the first plurality of channels and a cap configured to engage the member to secure the lifting bracket to the channel in the ring. The plurality of base assemblies may be configured to be attached to a plurality of fittings with a second plurality of channels associated with the fuselage of the aircraft. A base assembly in the plurality of base assemblies may comprise a base structure having a cavity configured to receive a fitting in the plurality of fittings and a plate configured to connect the plate to the base structure. The plurality of hydraulic lift units may be configured to move the plurality of lifting assemblies away from the plurality of base assemblies such that the ring moves away from the fuselage. The hydraulic pump may be configured to be attached to the plurality of hydraulic lift units and to send fluid into the plurality of hydraulic lift units to move the plurality of lifting assemblies away from the plurality of base assemblies such that the ring may move away from the fuselage. The plurality of measurement units may be configured to measure a displacement between the plurality of lifting assemblies and the plurality of base assemblies. The locking system may be configured to reduce a rotation of the ring while the plurality of lifting assemblies is attached to the first plurality of channels in the ring associated with the rotatable wing of the aircraft. The plurality of base assemblies may be attached to the plurality of fittings with the second plurality of channels associated with the fuselage of the aircraft. The first plurality of channels may be aligned with the second plurality of channels. The locking system may comprise a plurality of pins configured to be placed through the first plurality of channels attached to the plurality of lifting assemblies corresponding to the second plurality of channels in the plurality of base assemblies.

In yet another advantageous embodiment, a method may be present for moving a wing. A plurality of lifting assemblies may be attached to a first plurality of channels in a ring associated with the wing of an aircraft. A plurality of base assemblies may be attached to a plurality of fittings with a second plurality of channels associated with a fuselage of the aircraft. The plurality of lifting assemblies may be moved away from the plurality of base assemblies using a plurality of biasing systems such that the ring may move away from the fuselage.

In still yet another advantageous embodiment, a method may be present for lifting a wing away from a fuselage of an aircraft using a wing lift system. A ring associated with the wing of the aircraft may be rotated to align a first plurality of channels in the ring with a second plurality of channels in a plurality of fittings associated with the fuselage of the aircraft. A plurality of lifting assemblies may be attached to the first plurality of channels in the ring associated with the wing of the aircraft while the first plurality of channels is unaligned with the second plurality of channels in the plurality of fittings associated with the fuselage of the aircraft. A lifting assembly in the plurality of lifting assemblies may comprise a lifting bracket having a member configured to extend through a channel in the first plurality of channels and a cap configured to engage the member to secure the lifting bracket to the channel in the ring. A plurality of base assemblies may be attached to the plurality of fittings with the second plurality of channels associated with the fuselage of the aircraft while the first plurality of channels is unaligned with the second plurality of channels in the plurality of fittings associated with the fuselage of the aircraft. A base assembly in the plurality of base assemblies may comprise a base structure having a cavity configured to receive a fitting in the plurality of fittings; a plate configured to be connected to the base structure such that the base assembly is connected to the fitting; and a number of fasteners configured to connect the plate to the base structure. The plurality of lifting assemblies may be moved away from the plurality of base assemblies using a plurality of hydraulic lift units such that the ring may move away from the fuselage. A hydraulic pump may be configured to be attached to the plurality of hydraulic lift units and to send fluid into the plurality of hydraulic lift units to move the plurality of lifting assemblies away from the plurality of base assemblies such that the ring may move away from the fuselage.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 20 is an illustration of a flowchart of a process for moving a wing in accordance with an advantageous embodiment; and FIG. 21 is an illustration of a flowchart for using a wing lift system in accordance with an advantageous embodiment.

DETAILED DESCRIPTION

Figure 1:
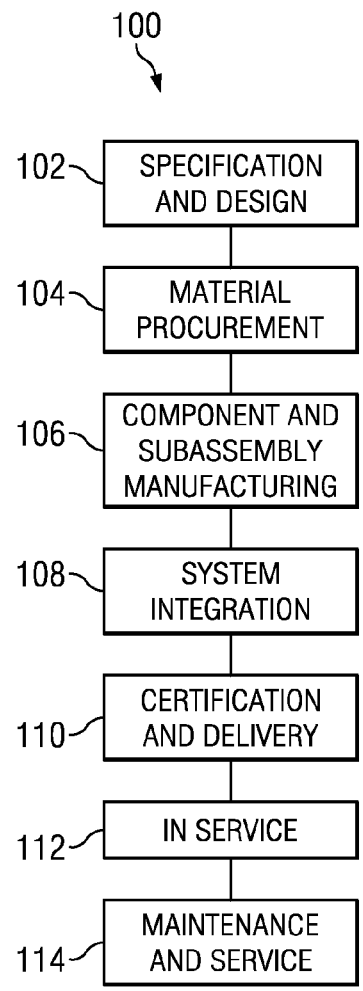
FIG. 1 is an illustration of an aircraft manufacturing and service method in accordance with an advantageous embodiment.
Figure 2:
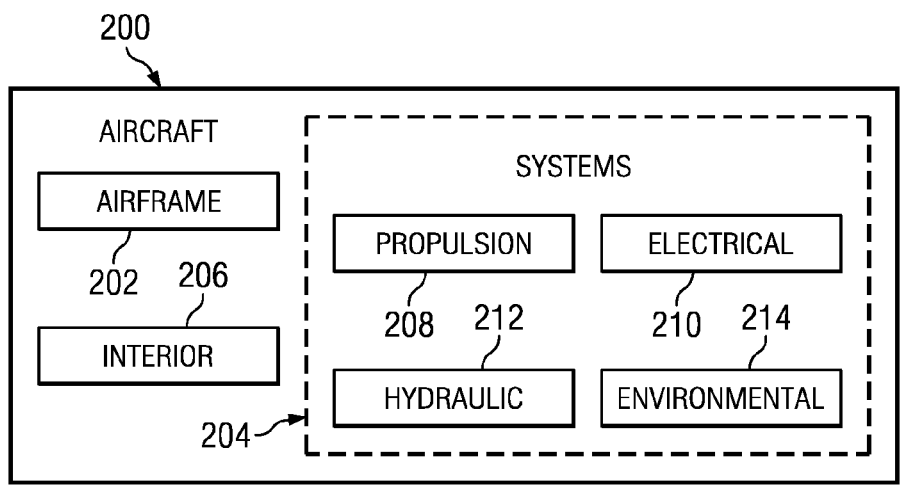
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and/or other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1.

A number, when referring to items, means one or more items. For example, a number of apparatus embodiments are one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially reduce time and expense for maintenance and service 114 for aircraft 200.

The different advantageous embodiments may recognize and take into account a number of different considerations. For example, without limitation, the different advantageous embodiments recognize and take into account that a ring may be associated with the wing. This ring may be a flexible ring that may be associated with the fuselage in a moveable or rotatable manner. With this type of configuration, a number of attachment points may be present for attaching the ring to the aircraft in a fixed position during flight. These attachment points may take the form of a fitting. Additionally, a number of different structures may be present to allow the ring to slide relative to the fuselage to rotate the wing when the aircraft is in a non-flight condition.

The different advantageous embodiments may recognize and take into account that maintenance may be required for this assembly from time to time. The different advantageous embodiments may recognize and take into account that currently, the maintenance may require disconnecting, cutting, or otherwise separating components extending between the fuselage and the wing. These components may include, for example, without limitation, wires, hydraulic lines, pneumatic lines, air ducts, and other components. After these components have been disconnected or removed, the wing may be removed from the aircraft by a crane or other support equipment designed to lift the wing.

Further, this operation may require a number of technicians and/or engineers to perform the maintenance. The different advantageous embodiments recognize and take into account that this type of maintenance may require about three weeks or more to perform and return the aircraft into service condition.

Thus, the different advantageous embodiments recognize and take into account one or more of the considerations discussed above, as well as possibly other considerations, and provide a method and apparatus for moving a wing to perform maintenance on an aircraft. In one or more of the advantageous embodiments, an apparatus may comprise a plurality of lifting assemblies, a plurality of base assemblies, and a plurality of biasing systems. Each lifting assembly in the plurality of lifting assemblies may be configured to be attached to a channel in a plurality of channels and a ring associated with a wing of the aircraft.

Each base assembly in the plurality of base assemblies may be configured to be attached to a fitting with a channel in a plurality of fittings with a plurality of channels associated with the fuselage of the aircraft. Each biasing system within the plurality of biasing systems may be configured to move an associated lifting assembly in the plurality of lifting assemblies away from an associated base assembly in the plurality of base assemblies such that the ring may move away from the fuselage.

Figure 3:
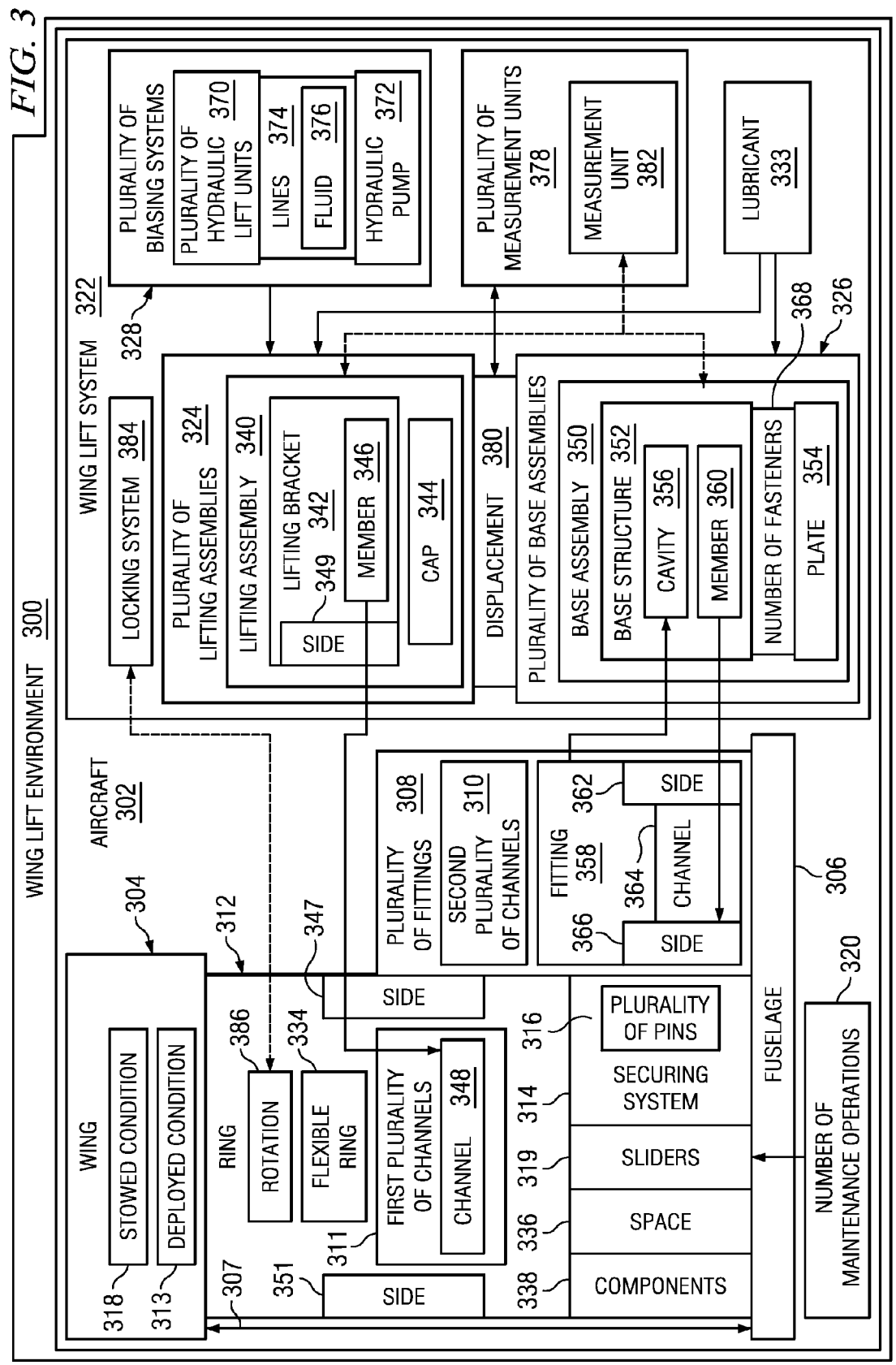
FIG. 3 is an illustration of a wing lift environment in accordance with an advantageous embodiment.

With reference now to FIG. 3, an illustration of a wing lift environment is depicted in accordance with an advantageous embodiment. Wing lift environment 300 may be an example of a wing lift environment that may be used during aircraft manufacturing and service method 100 in FIG. 1. In these illustrative examples, aircraft 302 may have wing 304 and fuselage 306. Aircraft 302 may be an example of one implementation for aircraft 200 in FIG. 2. Wing 304 and fuselage 306 may be examples of components in airframe 202 in FIG. 2. In this illustrative example, wing 304 may be associated with fuselage 306 in a manner such that wing 304 may rotate about vertical axis 307 through fuselage 306.

In these examples, plurality of fittings 308 with second plurality of channels 310 may be associated with fuselage 306. In these examples, first plurality of channels 311 in ring 312 may be aligned with second plurality of channels 310 in plurality of fittings 308 when wing 304 is in deployed condition 313. In this condition, securing system 314 may move plurality of pins 316 into first plurality of channels 311 aligned with second plurality of channels 310. When plurality of pins 316 is removed from first plurality of channels 311 and second plurality of channels 310, wing 304 may be rotated to place wing 304 in stowed condition 318.

Sliders 319 may be present in aircraft 302. Sliders 319 may be associated with fuselage 306 and may allow ring 312 to slide with less friction. After use over a period of time, number of maintenance operations 320 may be performed to recondition, replace, and/or otherwise perform maintenance on sliders 319. In some illustrative examples, sliders 319 may be lost or may become unusable for wing 304. This loss of sliders 319 may cause wing 304 to not lock in a desired manner. Further, the loss of sliders 319 may cause movement of ring 312. Movement of ring 312 may cause undesired characteristics on wing 304, fuselage 306, and/or plurality of fittings 308. Number of maintenance operations 320 may need to be performed to rework and/or recondition these undesired characteristics.

In some instances, number of maintenance operations 320 may be performed on wing 304 and/or fuselage 306 that may require separation of wing 304 from fuselage 306. In these situations, wing lift system 322 may be used to lift wing 304 relative to fuselage 306. In other words, wing lift system 322 may lift wing 304 away from fuselage 306.

In this illustrative example, wing lift system 322 may comprise plurality of lifting assemblies 324, plurality of base assemblies 326, and plurality of biasing systems 328. Plurality of lifting assemblies 324 may be configured to be attached to first plurality of channels 311 in ring 312 associated with wing 304 of aircraft 302. Ring 312, in these examples, may be flexible ring 334. Ring 312 may be made of various materials, such as, for example, without limitation, steel, titanium, metal alloys, and/or some other suitable materials. Plurality of base assemblies 326 may be configured to be attached to plurality of fittings 308 with second plurality of channels 310.

In these different advantageous embodiments, plurality of biasing systems 328 may move plurality of lifting assemblies 324 away from plurality of base assemblies 326. This movement may occur while wing 304 is in deployed condition 313. In this manner, flexible ring 334 may move away from fuselage 306. This movement may create space 336 between flexible ring 334 and fuselage 306. In this manner, number of maintenance operations 320 may be performed without disconnecting components 338 between wing 304 and fuselage 306.

In these illustrative examples, lifting assembly 340 may be an example of a lifting assembly within plurality of lifting assemblies 324. Lifting assembly 340 may comprise lifting bracket 342 and cap 344. Lifting bracket 342 may have member 346, which may be configured to extend through side 349 of lifting bracket 342 into channel 348 in first plurality of channels 311 on side 347 of ring 312. Cap 344 may be configured to engage member 346 on side 351 of ring 312 to secure lifting bracket 342 to channel 348 in ring 312. In these illustrative examples, side 347 may be opposite to side 349 of lifting bracket 342.

Base assembly 350 may be an example of a base assembly within plurality of base assemblies 326. Base assembly 350 may comprise base structure 352 and plate 354. Base structure 352 may have cavity 356 configured to receive fitting 358 in plurality of fittings 308. Base structure 352 also may have member 360. Member 360 may extend from side 362 of fitting 358 through channel 364 to side 366 of fitting 358. Plate 354 may be configured to be connected to base structure 352 such that base assembly 350 may be connected to fitting 358. Plate 354 may be located on side 366, while base structure 352 may be located on side 362. Further, the connection of plate 354 to base structure 352 may be made using number of fasteners 368.

In these illustrative examples, plurality of biasing systems 328 may comprise plurality of hydraulic lift units 370. Additionally, wing lift system 322 also may include hydraulic pump 372. Hydraulic pump 372 may be configured to be attached to plurality of hydraulic lift units 370 by lines 374. Hydraulic pump 372 may be configured to send fluid 376 into plurality of hydraulic lift units 370 to move plurality of lifting assemblies 324 away from plurality of base assemblies 326 such that ring 312 moves away from fuselage 306.

Plurality of lifting assemblies 324 and plurality of base assemblies 326 may be comprised of a number of different materials. For example, without limitation, plurality of lifting assemblies 324 and plurality of base assemblies 326 may be comprised of at least one of steel, titanium, a metal alloy, a carbide metal, and/or some other suitable material. The material selected may be one configured to withstand the forces that may occur when lifting wing 304 away from fuselage 306. In some advantageous embodiments, lubricant 333 may be used with plurality of lifting assemblies 324 and/or plurality of base assemblies 326. Lubricant 333 may be applied to surfaces of plurality of lifting assemblies 324 and/or plurality of base assemblies 326 in which the surfaces may slide against other surfaces. Lubricant 333 may take the form of a baked-on dry film lubricant in these examples.

Additionally, in some advantageous embodiments, plurality of measurement units 378 may be used. Plurality of measurement units 378 measures displacement 380 between plurality of lifting assemblies 324 and plurality of base assemblies 326. For example, without limitation, measurement unit 382 may be an example of a measurement unit within plurality of measurement units 378. Measurement unit 382 may be associated with lifting assembly 340 and base assembly 350 in a manner that allows measurement unit 382 to measure displacement 380 between lifting assembly 340 and base assembly 350.

Further, wing lift system 322 also may include locking system 384. Locking system 384 may be configured to reduce and/or eliminate rotation 386 of ring 312. Rotation 386 may be reduced and/or eliminated, while plurality of lifting assemblies 324 may be attached to first plurality of channels 311 in ring 312 associated with wing 304. Plurality of base assemblies 326 may be attached to plurality of fittings 308 with second plurality of channels 310, and first plurality of channels 311 may be aligned with second plurality of channels 310.

The illustration of wing lift environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, without limitation, in some advantageous embodiments, plurality of measurement units 378 and/or locking system 384 may be omitted. In yet other advantageous embodiments, plurality of biasing systems 328 may be associated or integrated as part of plurality of lifting assemblies 324 and/or plurality of base assemblies 326.

As another example, components other than sliders 319 may be examples of components for which number of maintenance operations 320 may be performed.

Figure 4:
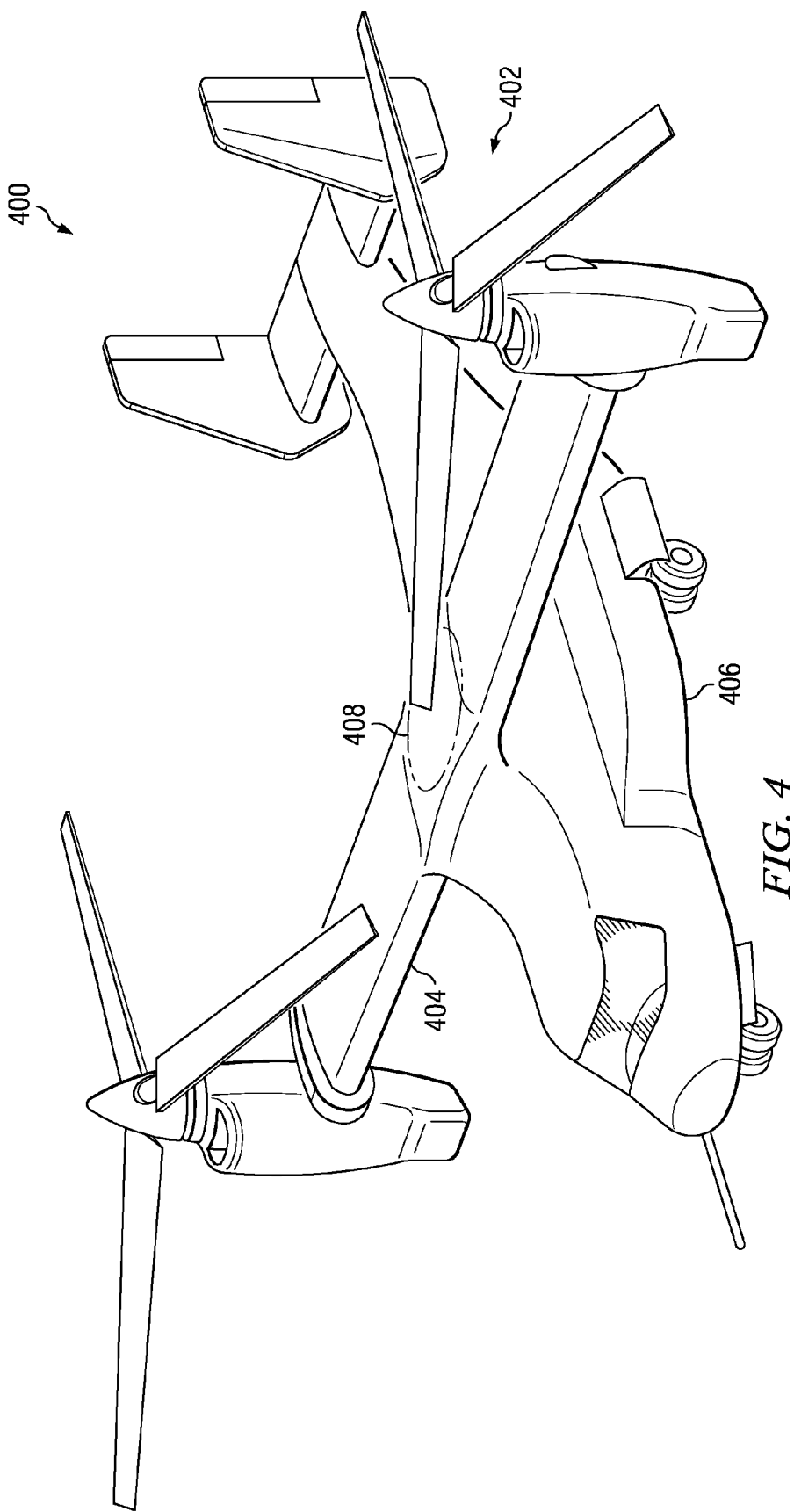
FIG. 4 is an illustration of an aircraft in accordance with an advantageous embodiment.

With reference now to FIG. 4, an illustration of an aircraft is depicted in accordance with an advantageous embodiment. In this illustrative example, aircraft 400 may be an example of one implementation for aircraft 200 in FIG. 2 and aircraft 302 in FIG. 3. Aircraft 400 may be tilt-rotor aircraft 402 in these illustrative examples.

As illustrated, wing 404 may be attached to fuselage 406. Wing 404 may be fixed during flight. Additionally, wing 404 may rotate using rotation system 408, in these illustrative examples, during non-flight conditions.

Figure 5:
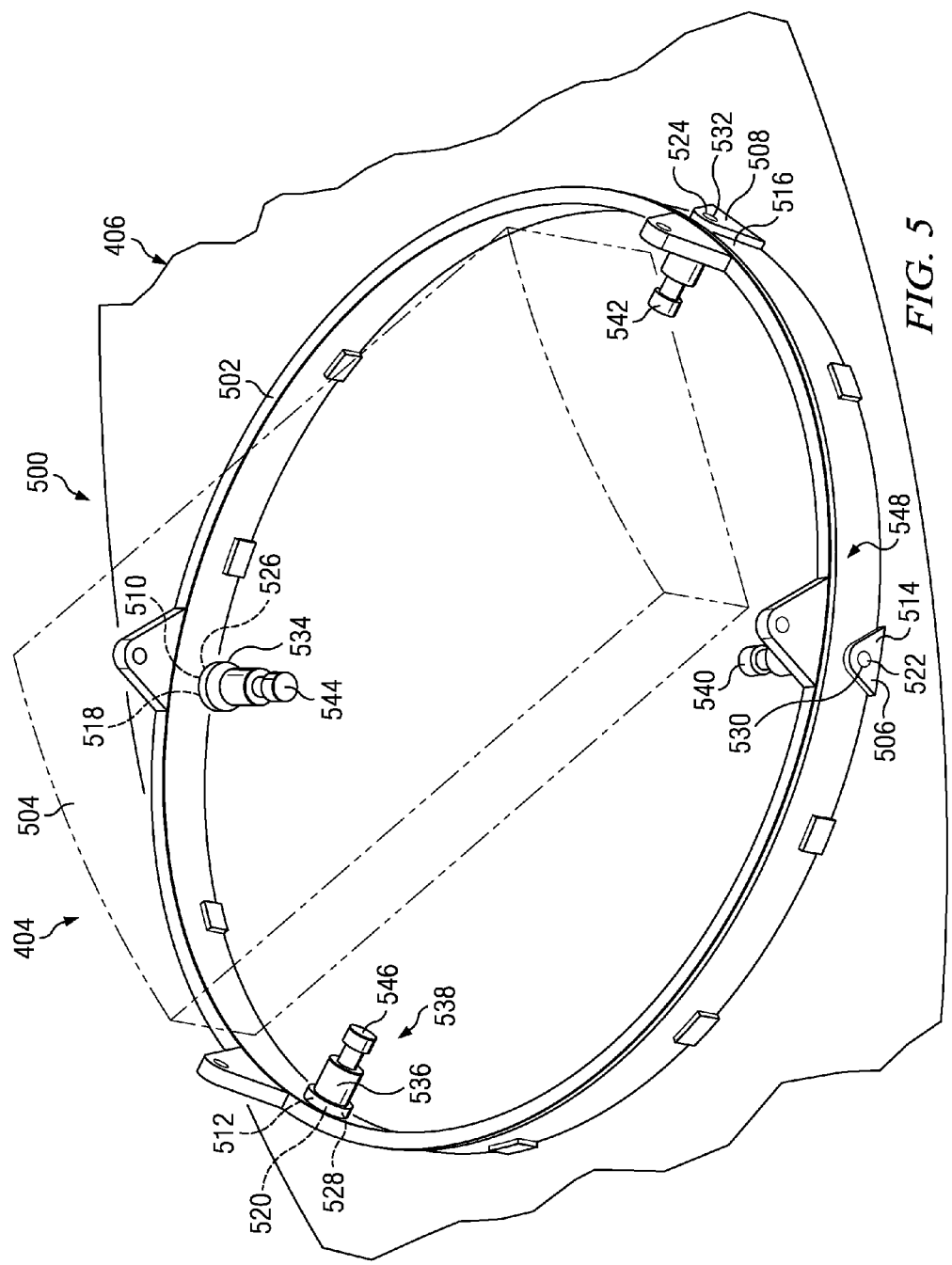
FIG. 5 is an illustration of a rotation system in accordance with an advantageous embodiment.

With reference now to FIG. 5, an illustration of a rotation system is depicted in accordance with an advantageous embodiment. In this illustrative example, rotation system 500 may be an example of one implementation of rotation system 408 in FIG. 4.

In these illustrative examples, ring 502 may be an example of one implementation of ring 312 in FIG. 3. Ring 502 may be associated with wing 404 in these examples. More specifically, ring 502 may be attached to wing box 504 for wing 404. In these illustrative examples, attachment points 506, 508, 510, and 512 may be present on fuselage 406. In these depicted examples, attachment points 506, 508, 510, and 512 take the form of fittings 514, 516, 518, and 520.

Channels 522, 524, 526, and 528 may be present in fittings 514, 516, 518, and 520, respectively. Each of these fittings may be aligned with channels 530, 532, 534, and 536 in ring 502. In some advantageous embodiments, fittings 514, 516, 518, and 520 may be associated with a number of retainers that guide and retain ring 502 while allowing ring 502 to rotate. These retainers may be removed when performing maintenance operations on ring 502.

When channels 522, 524, 526, and 528 are aligned with channels 530, 532, 534, and 536, securing system 538 may secure ring 502 to fuselage 406. In these examples, securing system 538 may comprise locking pins 540, 542, 544, and 546. In these illustrative examples, section 548 may be a section of rotation system 500 that may be described in more detail in FIGS. 10-13 below.

Figure 6:
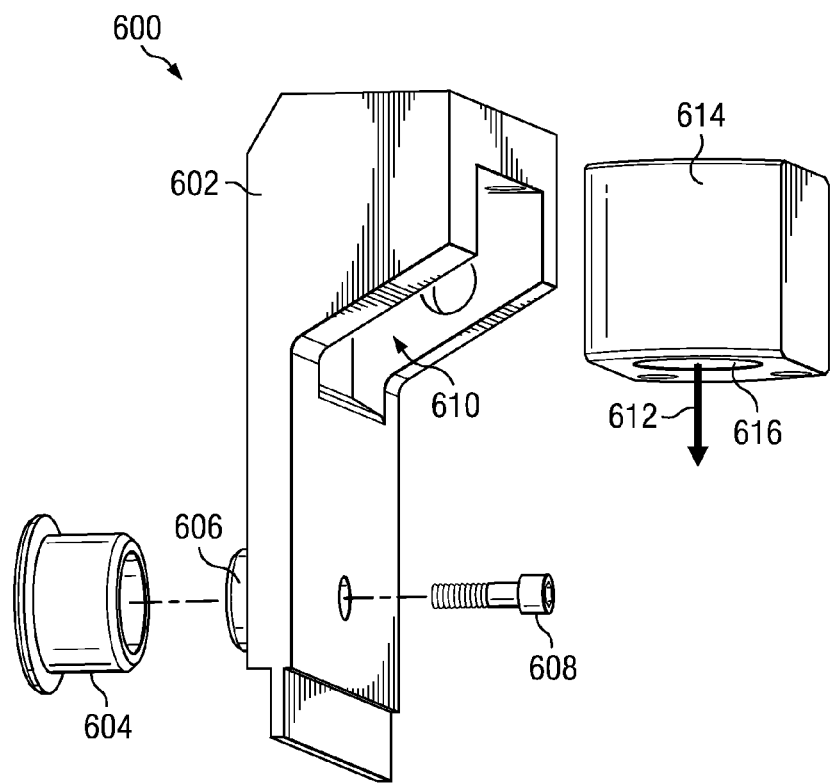
FIG. 6 is an illustration of a lifting assembly in accordance with an advantageous embodiment.

With reference now to FIG. 6, an illustration of a lifting assembly is depicted in accordance with an advantageous embodiment. In this illustrative example, lifting assembly 600 is shown in an exploded view. Lifting assembly 600 may be an example of one implementation for lifting assembly 340 in FIG. 3.

In this illustrative example, lifting assembly 600 may comprise lifting bracket 602, cap 604, member 606, and fastener 608. Lifting bracket 602 may be configured for attachment to ring 502 in FIG. 5 at channel 530. In these illustrative examples, member 606 may be configured to extend into channel 530 in FIG. 5. In some advantageous embodiments, member 606 may be a post. Cap 604 may secure lifting bracket 602 with member 606 in channel 530. Fastener 608 may secure cap 604 to lifting bracket 602 in these illustrative examples. Fastener 608 may secure cap 604 to lifting bracket 602 such that ring 502 in FIG. 5 may be secured in between lifting bracket 602 and cap 604.

In this illustrative example, lifting bracket 602 may have cavity 610. Cavity 610 may be configured to receive and hold biasing unit 614. Biasing unit 614 may have piston 616, which may extend in the direction of arrow 612.

Figure 7:
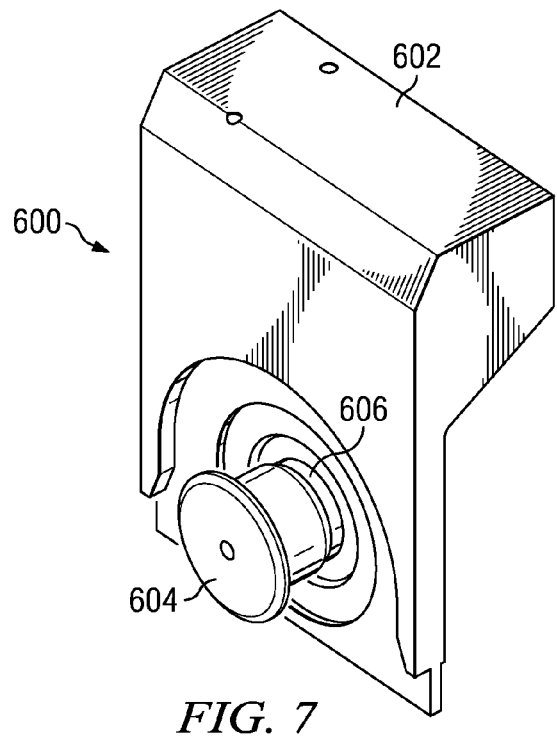
FIG. 7 is an illustration of an assembled view of a lifting assembly in accordance with an advantageous embodiment.

Turning now to FIG. 7, an illustration of an assembled view of lifting assembly 600 in FIG. 6 is depicted in accordance with an advantageous embodiment. In other illustrative examples, lifting bracket 602 and cap 604 may be secured with ring 502 in FIG. 5 between lifting bracket 602 and cap 604.

Figure 8:
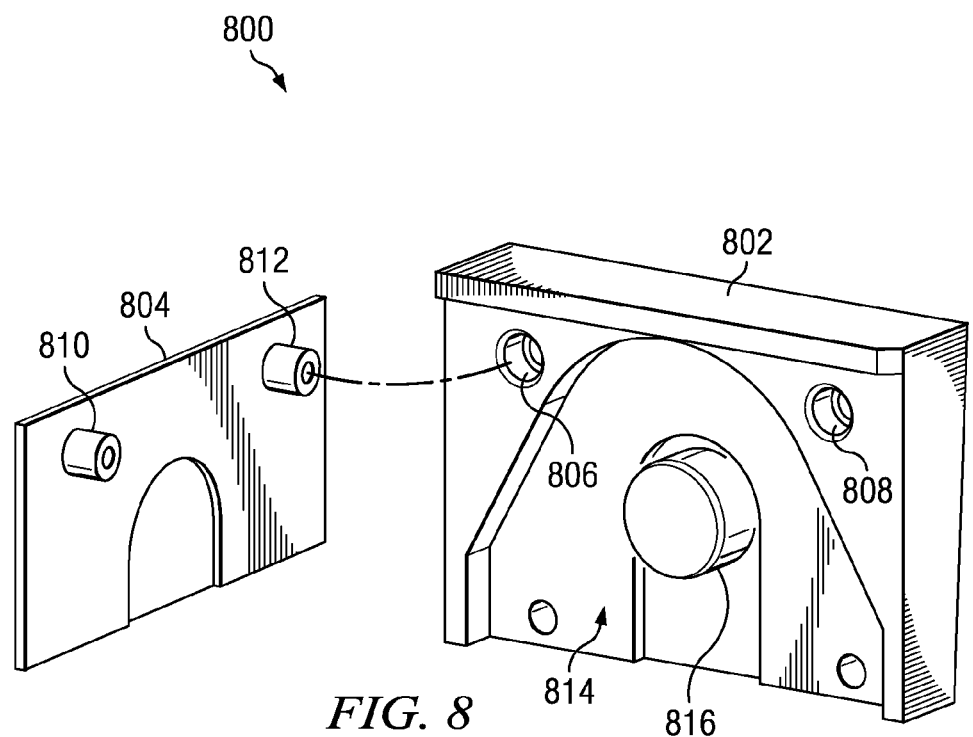
FIG. 8 is an illustration of a base assembly in accordance with an advantageous embodiment.

Turning now to FIG. 8, an illustration of a base assembly is depicted in accordance with an advantageous embodiment. Base assembly 800 is shown in an unassembled view in this figure. Base assembly 800 is an example of one implementation for base assembly 350 in FIG. 3.

As illustrated, base assembly 800 may comprise base structure 802 and plate 804. Plate 804 may be configured to be secured to base structure 802. In these illustrative examples, base structure 802 may have channel 806 and channel 808. Members 810 and 812 on plate 804 may be configured to be placed into channels 806 and 808, respectively. Fasteners (not shown) may then be used to secure plate 804 to base assembly 802.

Base assembly 802, in this example, may have cavity 814. Cavity 814 may be configured to receive a fitting, such as fitting 514 in FIG. 5. In this example, member 816 within cavity 814 may extend into channel 522 in FIG. 5 for fitting 514. Member 816 also may take the form of a post.

Figure 9:
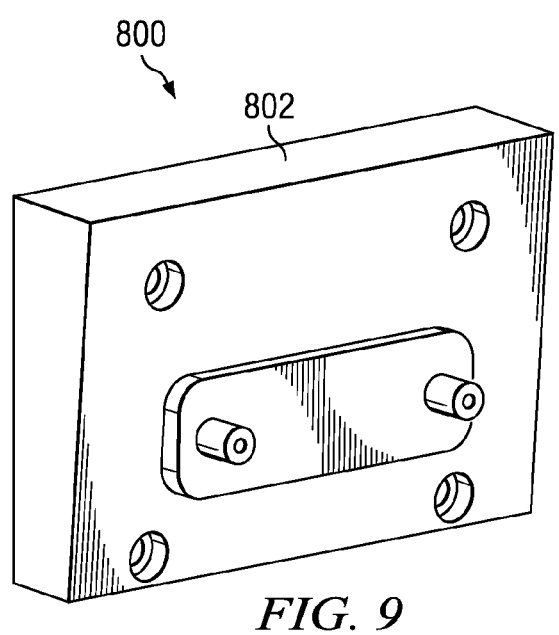
FIG. 9 is an illustration of an assembled view of a base assembly in accordance with an advantageous embodiment.

In FIG. 9, an illustration of an assembled view of a base assembly is depicted in accordance with an advantageous embodiment.

Figure 10:
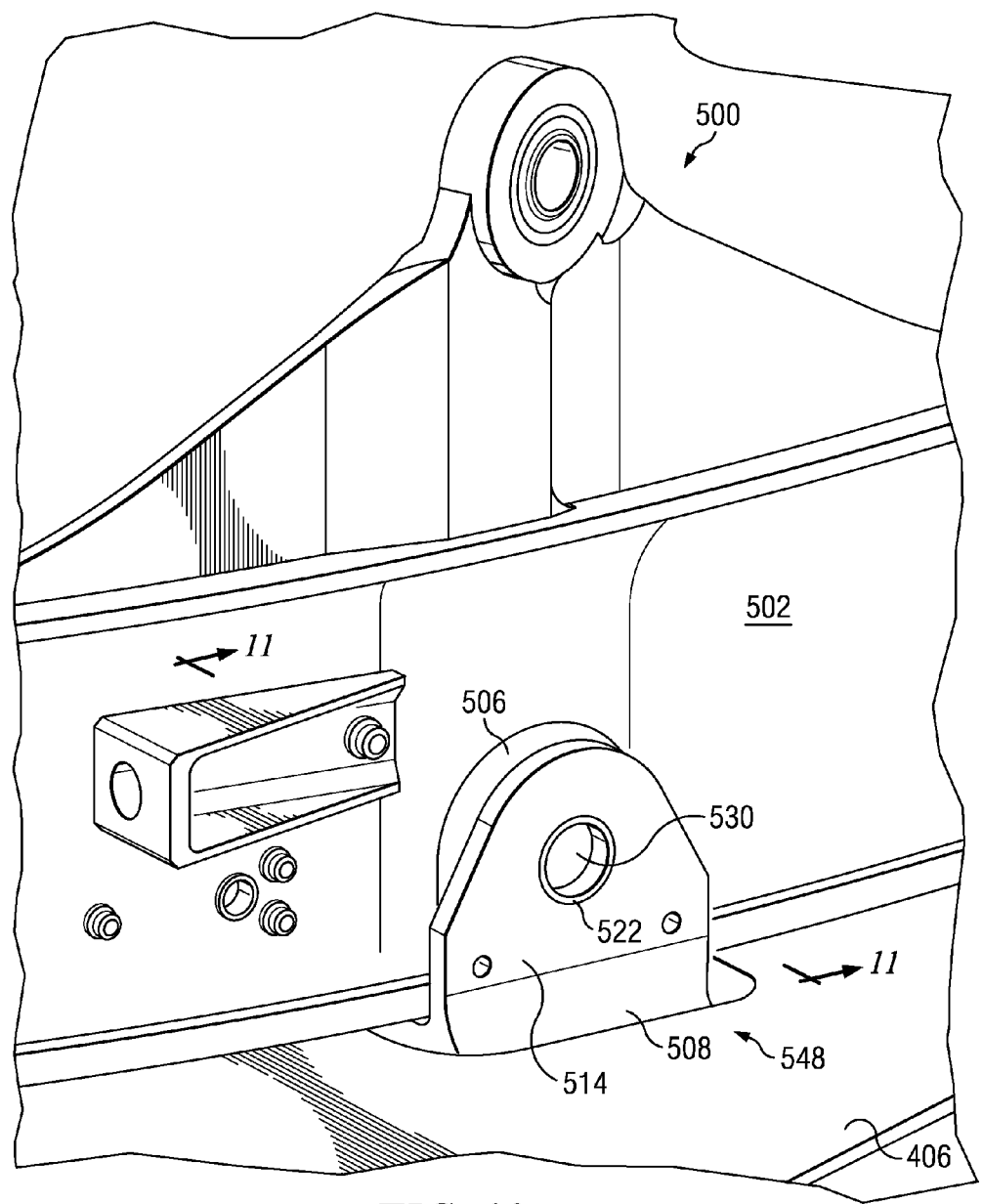
FIG. 10 is an illustration of a more detailed view of a portion of a rotation system in accordance with an advantageous embodiment.

With reference now to FIG. 10, an illustration of a more detailed view of a portion of rotation system 500 in FIG. 5 is depicted in accordance with an advantageous embodiment. In this illustrative example, a more detailed view of section 548 in FIG. 5 is illustrated. In this view, channel 522 in fitting 514 may be aligned with channel 530 in ring 502.

Figure 11:
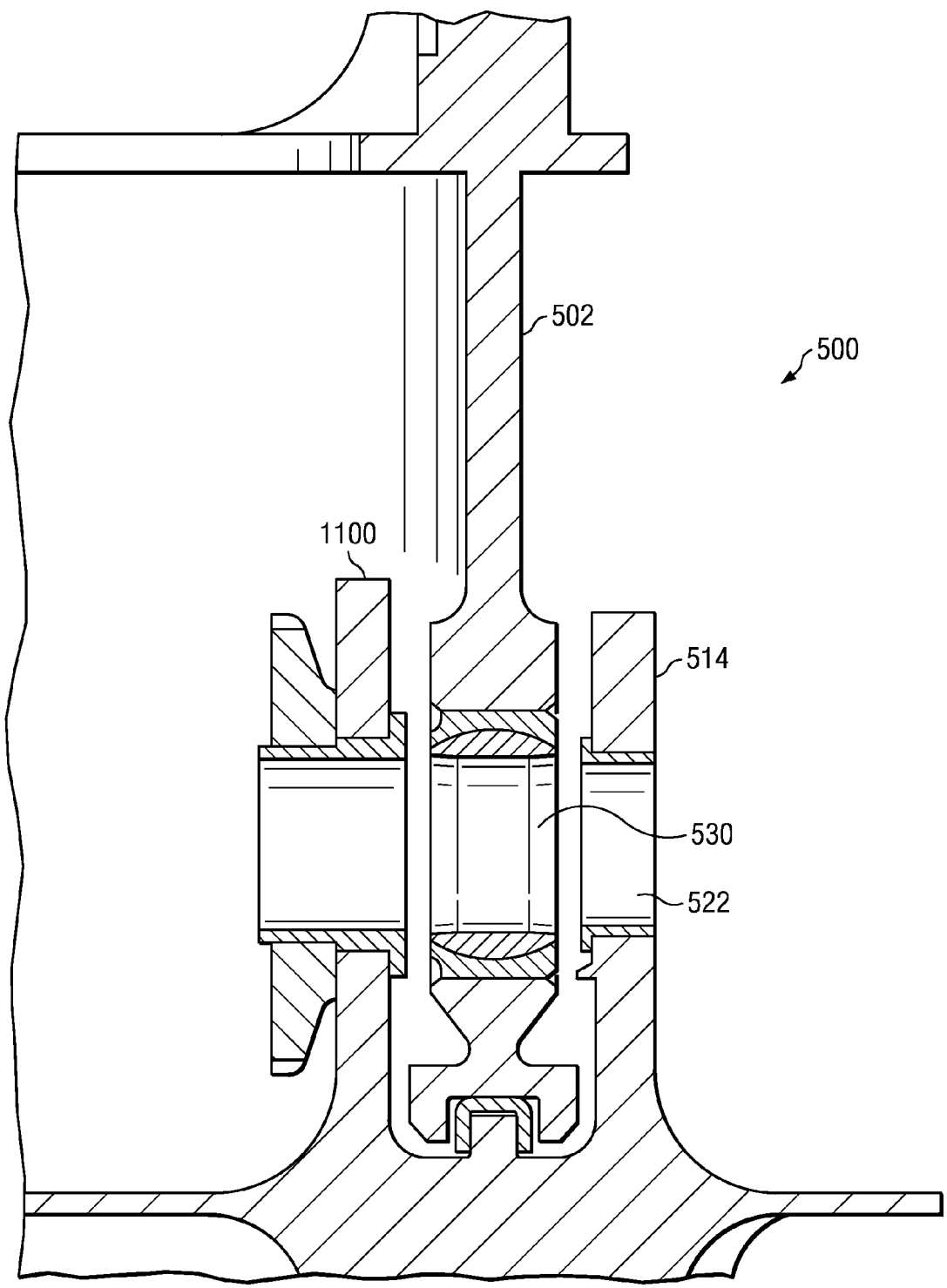
FIG. 11 is an illustration of a cross-sectional view of a portion of a ring in accordance with an advantageous embodiment.

In FIG. 11, an illustration of a cross-sectional view of a portion of a ring is depicted in accordance with an advantageous embodiment. In this illustrative example, a portion of ring 502 and fitting 514 is depicted taken along lines 11-11 in FIG. 10. In this view, fitting 1100 also may be seen in addition to fitting 514. Fitting 1100 may be associated with fuselage 406 in FIG. 4.

Figure 12:
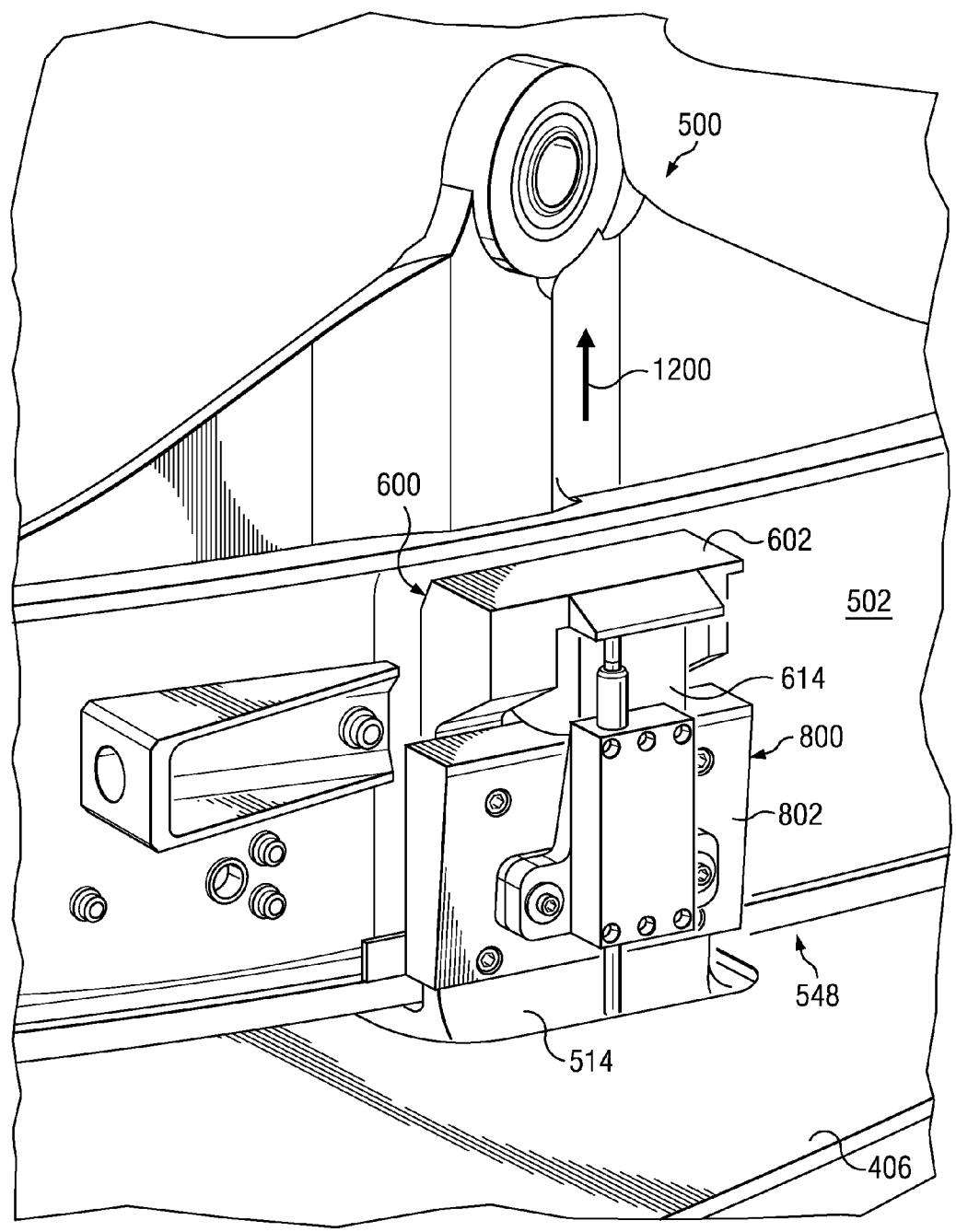
FIG. 12 is an illustration of a portion of a wing lift system in accordance with an advantageous embodiment.

With reference now to FIG. 12, an illustration of a portion of a wing lift system is depicted in accordance with an advantageous embodiment. In this view, lifting assembly 600 may be secured to ring 502, while base assembly 800 may be secured to fitting 514, which is hidden by biasing unit 614 in this view. As can be seen in this view, biasing unit 614 may be in place in a manner such that operation of biasing unit 614 may move lifting bracket 602 in the direction of arrow 1200.

In this manner, ring 502 may be moved away from fuselage 406 and associated fitting 514.

Figure 13:
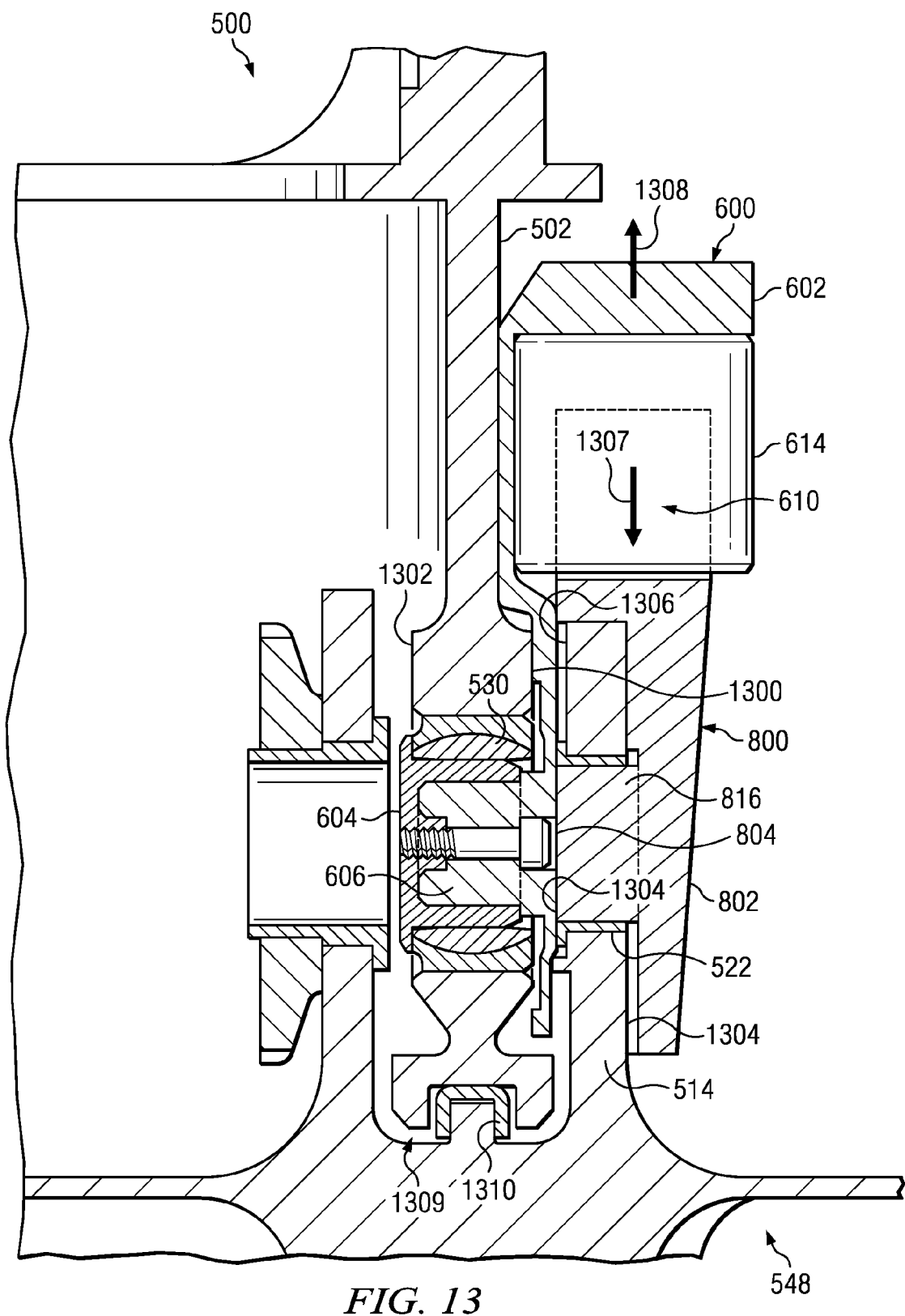
FIG. 13 is an illustration of a cross-sectional view of a ring and fitting with a portion of a wing lift system in accordance with an advantageous embodiment.

With reference next to FIG. 13, an illustration of a cross-sectional view of a ring and fitting with a portion of a wing lift system is depicted in accordance with an advantageous embodiment. In this view, a cross-sectional view of ring 502 and fitting 514, which is positioned under biasing unit 614 in this view, is depicted with lifting assembly 600, base assembly 800, and biasing unit 614 in place.

In this illustrative example, member 606 may extend from lifting bracket 602 in lifting assembly 600 on side 1300 of ring 502 through channel 530. Cap 604 may engage member 606 on side 1302 of ring 502. Member 816 may extend into channel 522 on side 1304 of fitting 514. Plate 804 may be located on side 1306 of fitting 514 and may be secured to base structure 802.

Biasing unit 614 may be located within cavity 610. Biasing unit 614 may apply force in the direction of arrow 1307. This force may cause lifting bracket 600 to move in the opposite direction of arrow 1307 in the direction of arrow 1308. This movement of lifting bracket 602 may cause ring 502 to move in the direction of arrow 1308 away from fuselage 406. This movement may increase the size of space 1309, which may allow for maintenance to be performed. For example, maintenance may be performed on slider 1310. More specifically, slider 1310 may be replaced if space 1309 is increased by using lifting assembly 600, base assembly 800, and biasing unit 614.

The different advantageous embodiments recognize that jacking methods for lifting ring 502 may not be used to increase the size of space 1309. Typical jacking methods may require space for a jack to be positioned under ring 502 and a reacting surface for the jack to push against. In these illustrative examples, ring 502 may not have enough space for the jack to be positioned under ring 502. Further, the jack may not have a reacting surface to push against to lift ring 502. For example, without limitation, the surface of fuselage 406 may not have a desired hardness to function as a reacting surface for the jack. In these different advantageous embodiments, lifting assembly 600, base assembly 800, and biasing unit 614 may be used to lift ring 502 without needing additional space under ring 502 and/or a reacting surface.

Figure 14:
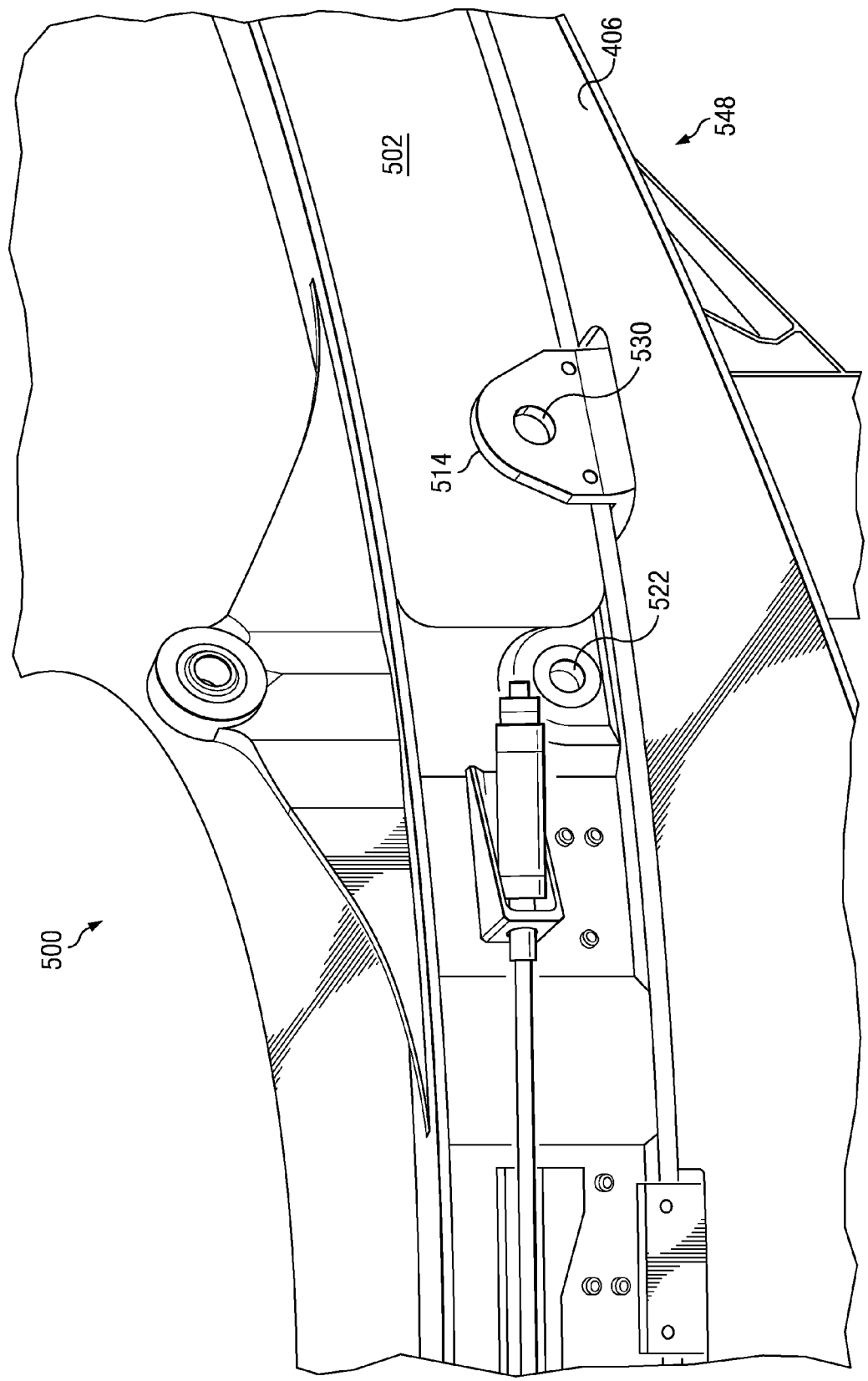
FIG. 14 is an illustration of steps involved in installing and operating a wing lift system in accordance with an advantageous embodiment.

Turning to FIGS. 14-19, illustrations of steps involved in installing and operating a wing lift system are depicted in accordance with an advantageous embodiment. Turning first to FIG. 14, in this illustrative example, ring 502 may be rotated such that channel 530 and channel 522 may be unaligned.

Figure 15:
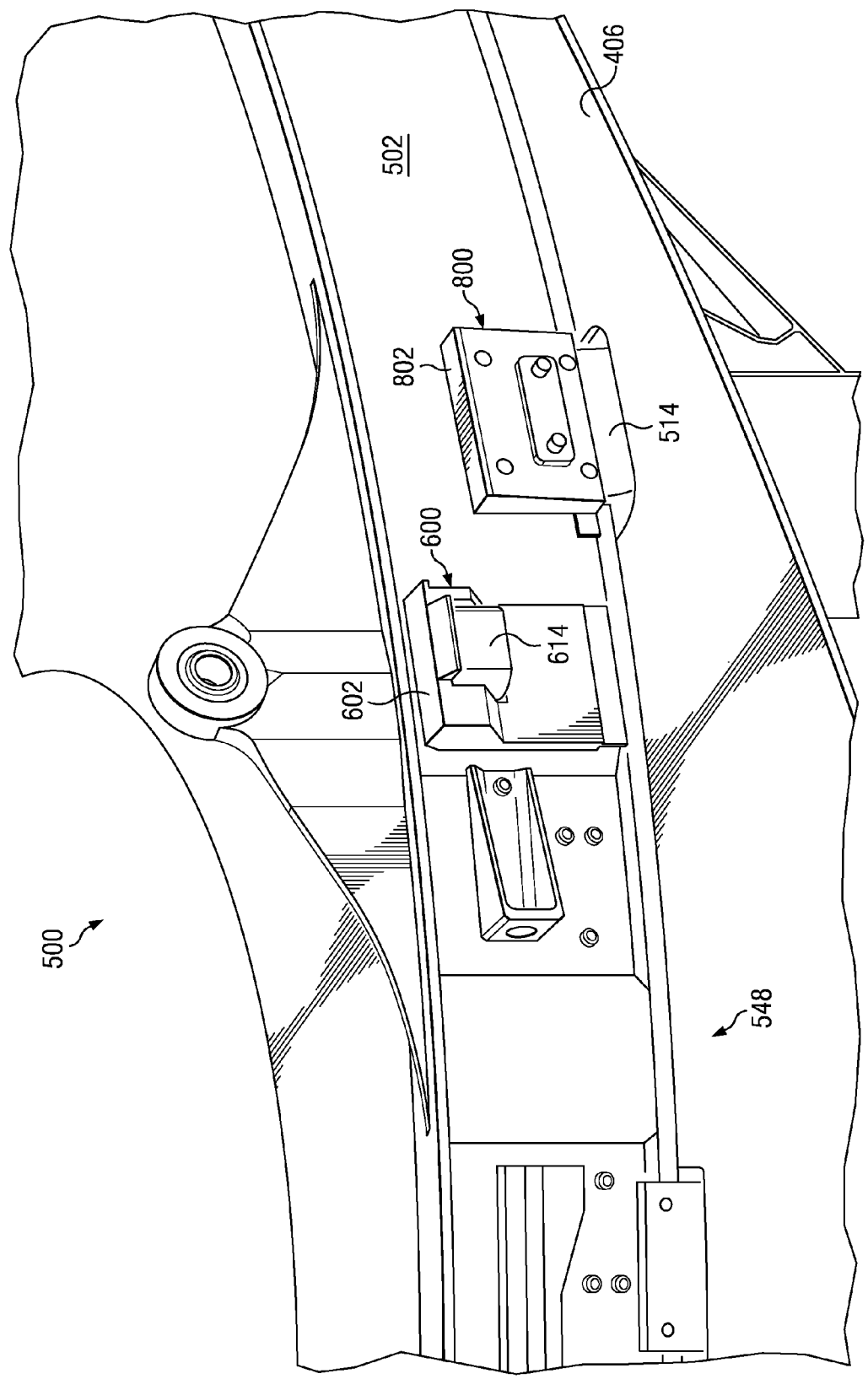
FIG. 15 is an illustration of installation of components for a wing lift system in accordance with an advantageous embodiment.

In FIG. 15, an illustration of installation of components for a wing lift system is depicted in accordance with an advantageous embodiment. In this example, lifting assembly 600 may be attached to channel 522 in FIG. 5, hidden in this view by lifting assembly 600, in ring 502. Base assembly 800 may be attached to fitting 514.

Figure 16:
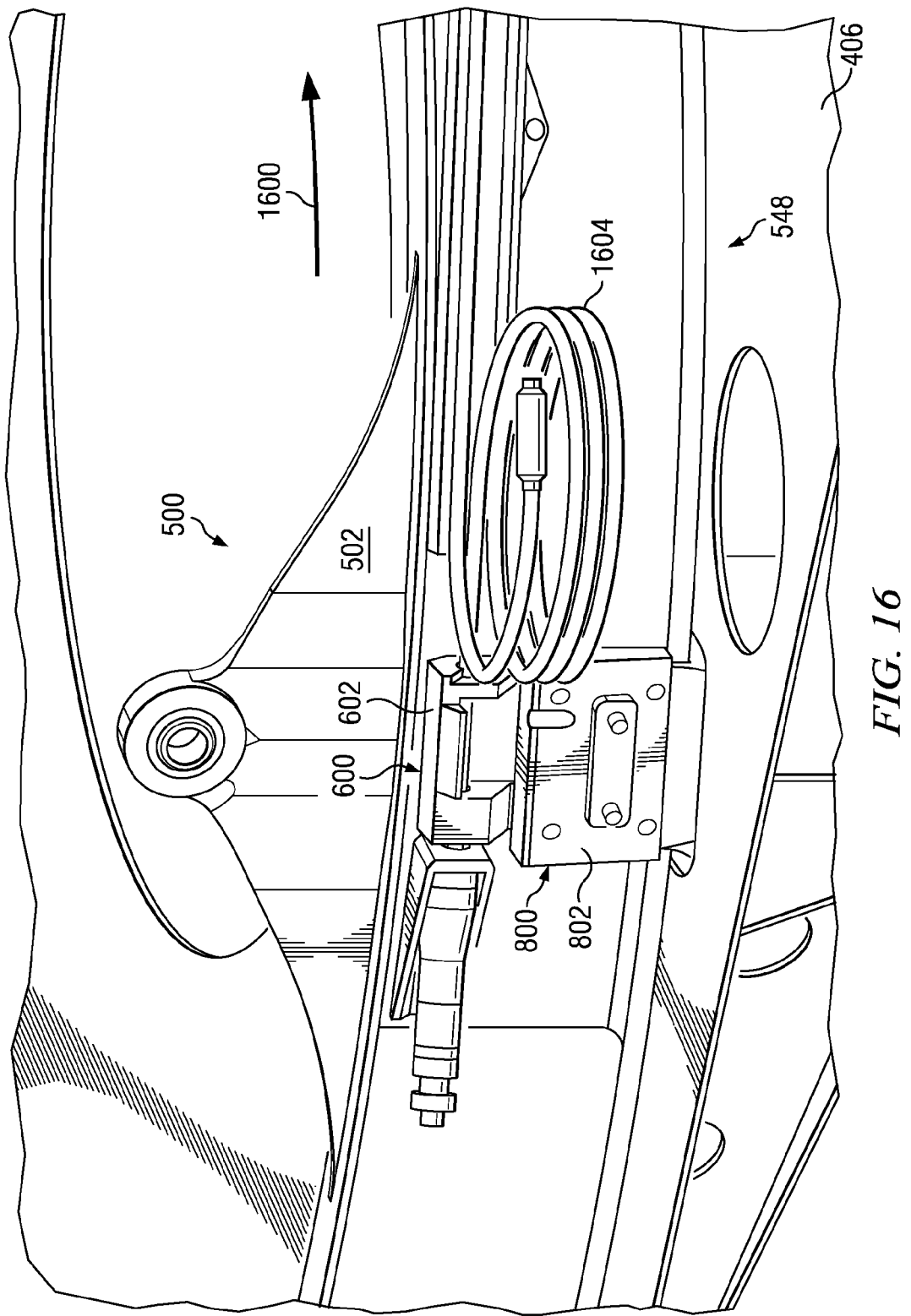
FIG. 16 is an illustration of steps involved in installing and operating a wing lift system in accordance with an advantageous embodiment.

With reference next to FIG. 16, ring 502 may be rotated in the direction of arrow 1600 such that channel 530 (not shown in this view) and channel 522 (also not shown in this view) may be aligned. In this manner, lifting assembly 600 and base assembly 800 may be aligned with each other.

In some advantageous embodiments, cable 1604 may be placed through lifting assembly 600. Cable 1604 may be part of rotation system 500 used to rotate ring 502. Further, cable 1604 may be used to align lifting assembly 600 and base assembly 800.

Figure 17:
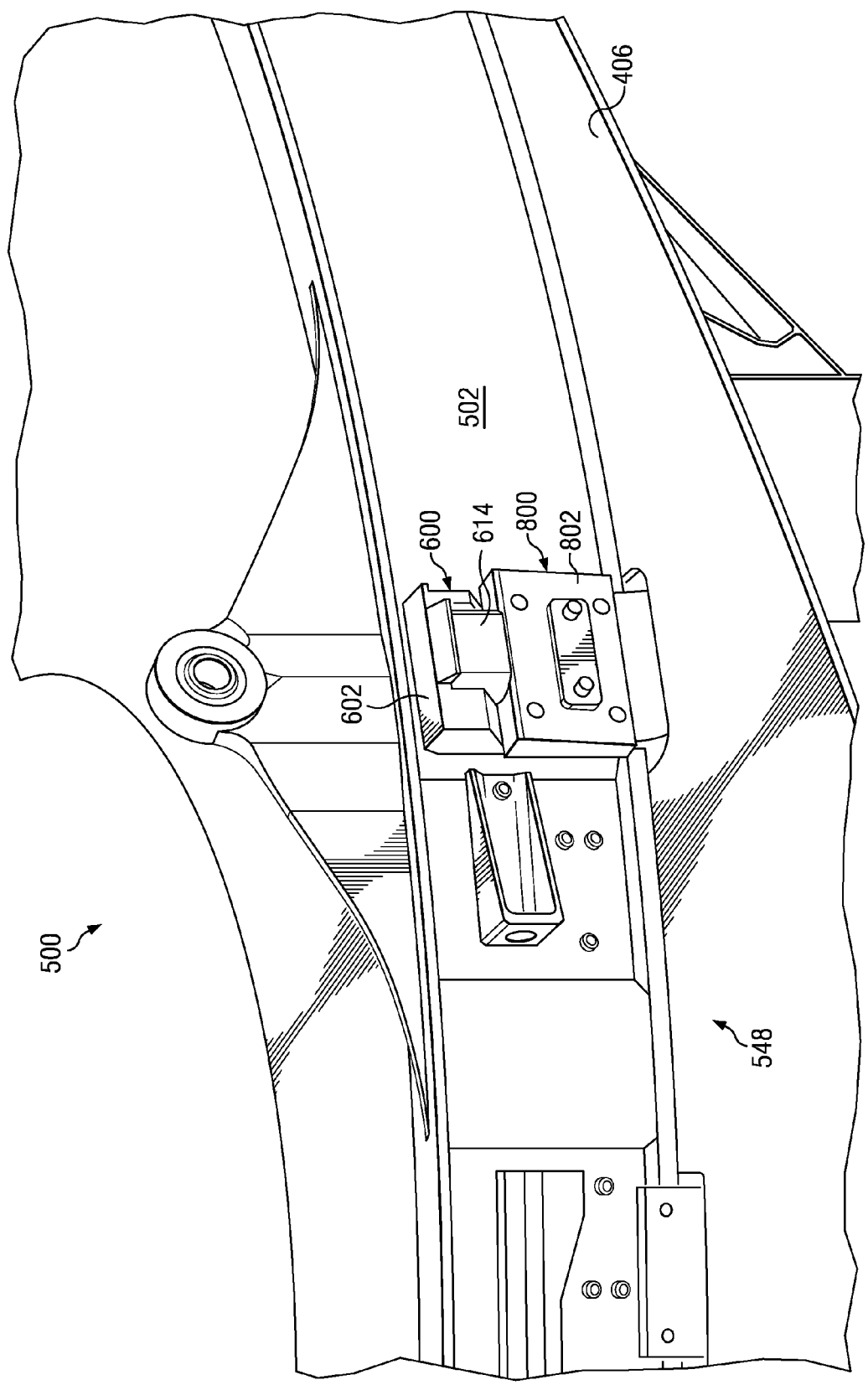
FIG. 17 is an illustration of a completed assembly of a lifting assembly, a base assembly, and a biasing unit in accordance with an advantageous embodiment.

With reference now to FIG. 17, an illustration of a completed assembly of a lifting assembly, a base assembly, and a biasing unit is depicted in accordance with an advantageous embodiment. In this example, biasing unit 614 may be placed between lifting assembly 600 and base assembly 800.

Figure 18:
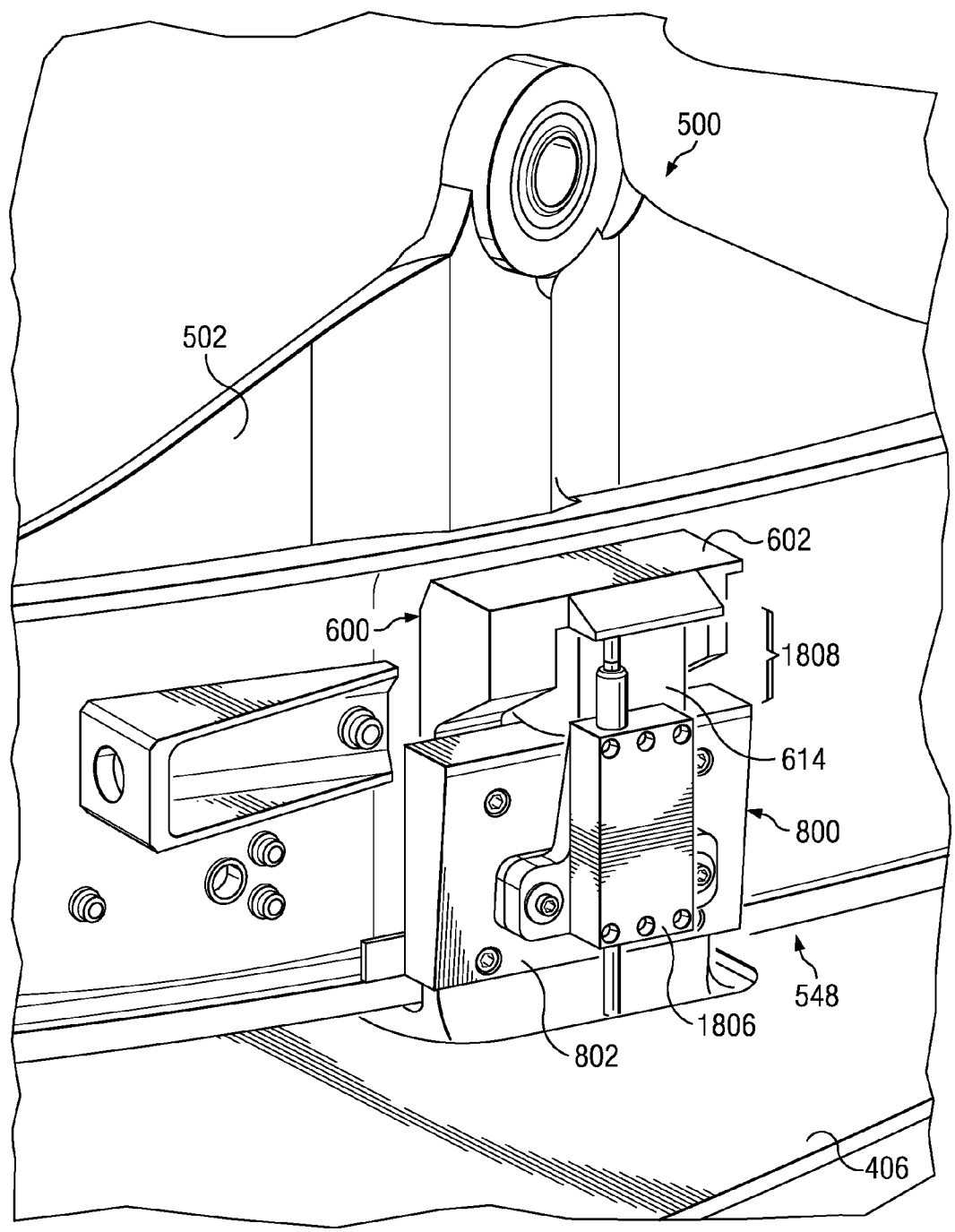
FIG. 18 is an illustration of a portion of a wing lift system in accordance with an advantageous embodiment.

Turning now to FIG. 18, an illustration of a portion of a wing lift system is depicted in accordance with an advantageous embodiment. In this illustrative example, measurement unit 1806 may be present. Measurement unit 1806 may measure displacement 1808 between lifting assembly 600 and base assembly 800. Measurement unit 1806 may generate and transmit information wirelessly to a remote location. In this view, ring 502 may sit on sliders (not shown).

Figure 19:
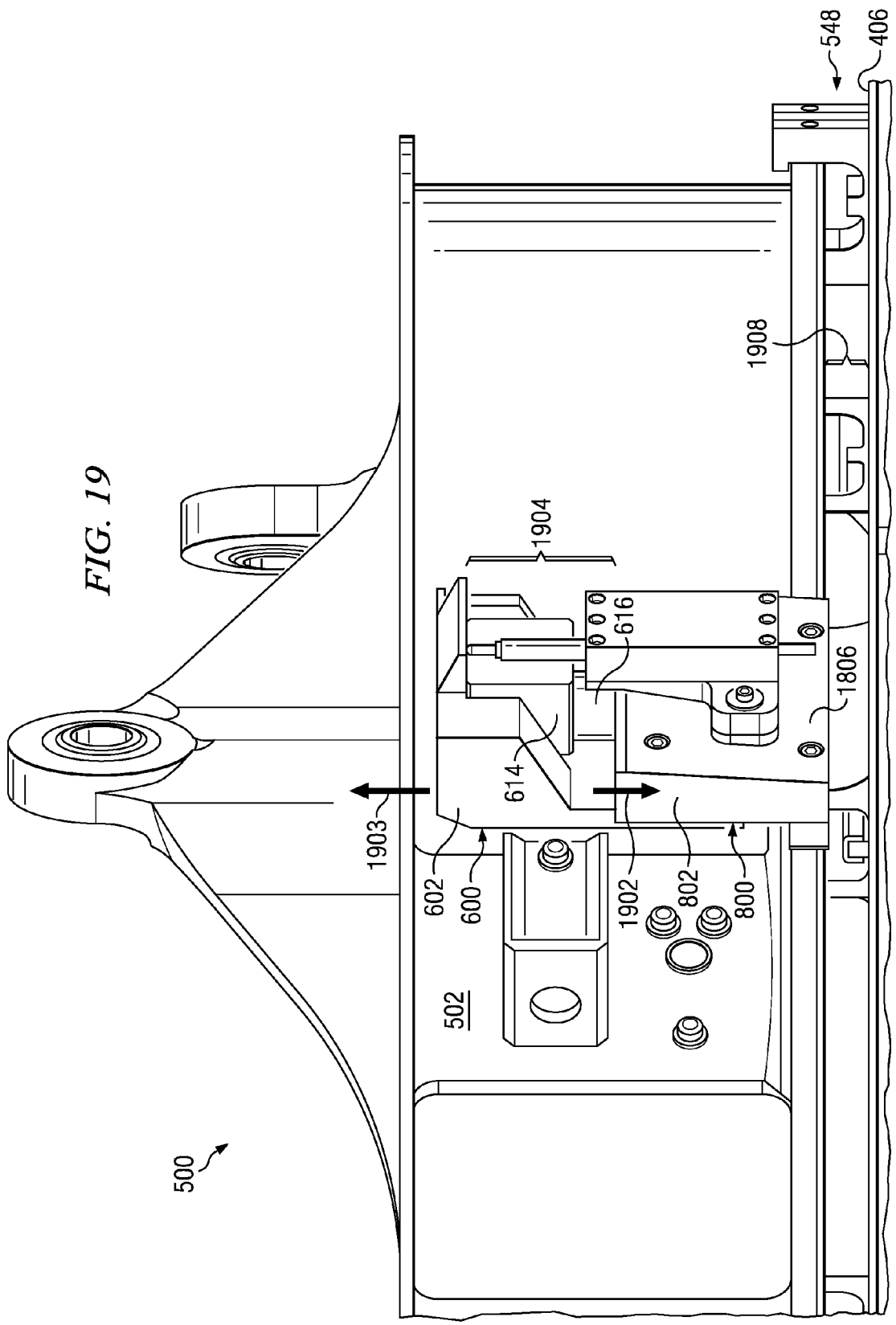
FIG. 19 is an illustration of a wing in a lifted position in accordance with an advantageous embodiment.

With reference now to FIG. 19, an illustration of a wing in a lifted position is depicted in accordance with an advantageous embodiment. In this illustrative example, biasing unit 614 may have moved piston 616 (not shown in this view) in the direction of arrow 1902. This movement of piston 616 may cause displacement 1904. Displacement 1904 may be greater than displacement 1808 in FIG. 18. This movement of piston 616 may cause ring 502 to move in the direction of arrow 1903.

As a result, gap 1908 may be present between ring 502 and fuselage 406. Gap 1908 may be about 0.5 inches in these illustrative examples. Of course, different gaps may be selected, depending on the particular implementation and maintenance operation to be performed.

With reference now to FIG. 20, an illustration of a flowchart of a process for moving a wing is depicted in accordance with an advantageous embodiment. The process illustrated in FIG. 20 may be implemented in wing lift environment 300 in FIG. 3. In particular, the process may be implemented using wing lift system 322 to move wing 304 relative to fuselage 306.

The process may begin by attaching plurality of lifting assemblies 324 to first plurality of channels 311 in ring 312 associated with wing 304 of aircraft 302 (operation 2000). The process may then attach plurality of base assemblies 326 to plurality of fittings 308 with second plurality of channels 310 (operation 2002). The process may then move plurality of lifting assemblies 324 away from plurality of base assemblies 326 using plurality of biasing systems 328 such that ring 312 moves away from fuselage 306 (operation 2004), with the process terminating thereafter.

With reference now to FIG. 21, an illustration of a flowchart for using a wing lift system is depicted in accordance with an advantageous embodiment. The process illustrated in FIG. 21 describes operations for performing maintenance on an aircraft. The process illustrated in FIG. 21 may be implemented using wing lift environment 300 in FIG. 3.

The process may begin by rotating ring 312 associated with wing 304 (operation 2100). This rotation may be, for example, about a few degrees. As one illustrative example, ring 312 may be rotated from about 12 degrees to about 15 degrees. The rotation of ring 312 may be such that wing lift system 322 may be installed onto ring 312.

Plurality of lifting assemblies 324 may be connected to first plurality of channels 311 for ring 312 (operation 2102). Plurality of base assemblies 326 may be connected to plurality of fittings 308 with second plurality of channels 310 (operation 2104). The process also may connect plurality of biasing systems 328 to plurality of lifting assemblies 324 (operation 2106).

The process may then rotate ring 312 such that first plurality of channels 311 may be substantially aligned with second plurality of channels 310 (operation 2107). Ring 312 may be rotated in operation 2107 using a cable, such as cable 1604 in FIG. 16. Thereafter, the process may operate plurality of biasing systems 328 such that ring 312 with wing 304 may move away from fuselage 306 (operation 2108). This operation may result in a displacement being present between ring 312 and fuselage 306.

Blocks may then be placed into the gap (operation 2110). The blocks may provide for additional safety such that reliance on plurality of biasing systems 328 to maintain the gap is reduced and/or unnecessary. The process may then perform maintenance operations on ring 312 and/or on components around or otherwise associated with ring 312 (operation 2112). In operation 2112, maintenance operations may be performed while plurality of biasing systems 328 is not in operation.

When the maintenance operations are completed, the process may then remove the blocks (operation 2114). The process may then operate plurality of biasing systems 328 to lower ring 312 onto fuselage 306 (operation 2116). The process may then rotate ring 312 using a cable (operation 2118). In operation 2118, the cable used to rotate ring 312 may be a different cable than cable 1604 used to rotate ring 312 in operation 2107. Plurality of lifting assemblies 324, plurality of base assemblies 326, and plurality of biasing systems 328 may then be removed (operation 2120). Thereafter, cables for use with ring 312 may be reinstalled (operation 2122). The process may then rotate ring 312 with wing 304 to a desired position (operation 2124), with the process terminating thereafter.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

For example, in some advantageous embodiments, the base assemblies may be installed before the lifting assemblies. In yet other advantageous embodiments, a base assembly and a lifting assembly may be installed at the same time at a particular location. In yet other advantageous embodiments, the biasing systems may already be associated with the lifting assemblies. In some advantageous embodiments, the biasing systems may be used with safety blocks, lift spacers, and/or other components to provide additional lift. In other advantageous embodiments, the biasing systems may be used to retract lift provided by the lifting assemblies.

Thus, the different advantageous embodiments may provide a method and apparatus for moving a wing. In one advantageous embodiment, a plurality of lifting assemblies may be configured to be attached to a first plurality of channels in a ring associated with a wing of an aircraft. A plurality of base assemblies may be configured to be attached to a plurality of fittings with a second plurality of channels associated with a fuselage of the aircraft. A plurality of biasing systems may be configured to move the plurality of lifting assemblies away from the plurality of base assemblies such that the ring moves away from the fuselage.

With the wing lift system in the different advantageous embodiments, the time and expense needed to perform maintenance on an aircraft, such as tilt-rotor aircraft 402, may be reduced. In the different advantageous embodiments, the wing lift system may reduce or eliminate the need for a crane and the number of people currently needed to move the wing into a position to perform maintenance. Further, with the different advantageous embodiments, the movement of the wing away from the fuselage may be such that removal or disconnection of components between the wing and the fuselage may be reduced or unnecessary.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a plurality of lifting assemblies configured to be attached to a first plurality of channels in a ring associated with a wing of an aircraft, a lifting assembly in the plurality of lifting assemblies comprising a lifting bracket having a member configured to extend through a channel in the first plurality of channels and a cap configured to engage the member to secure the lifting bracket to the channel in the ring;
   a plurality of base assemblies configured to be attached to a plurality of fittings with a second plurality of channels associated with a fuselage of the aircraft; and
   a plurality of biasing systems configured to move the plurality of lifting assemblies away from the plurality of base assemblies such that the ring moves away from the fuselage.

2. The apparatus of claim 1, wherein a base assembly in the plurality of base assemblies comprises:
   a base structure having a cavity configured to receive a fitting in the plurality of fittings; and
   a plate configured to be connected to the base structure such that the base assembly is connected to the fitting.

3. The apparatus of claim 2, wherein the base assembly further comprises:
   a number of fasteners configured to connect the plate to the base structure.

4. The apparatus of claim 1, wherein the plurality of biasing systems comprises:
   a plurality of hydraulic lift units.

5. The apparatus of claim 4 further comprising:
   a hydraulic pump configured to be attached to the plurality of hydraulic lift units and to send fluid into the plurality of hydraulic lift units to move the plurality of lifting assemblies away from the plurality of base assemblies such that the ring moves away from the fuselage.

6. The apparatus of claim 1 further comprising:
   a plurality of measurement units configured to measure a displacement between the plurality of lifting assemblies and the plurality of base assemblies.

7. The apparatus of claim 1 further comprising:
   a locking system configured to prevent a rotation of the ring while the plurality of lifting assemblies is attached to the first plurality of channels in the ring associated with the wing of the aircraft, and the plurality of base assemblies is attached to the plurality of fittings with the second plurality of channels associated with the fuselage of the aircraft in which the first plurality of channels is aligned with the second plurality of channels.

8. The apparatus of claim 7, wherein the locking system comprises:
   a plurality of pins configured to be placed through the first plurality of channels attached to the plurality of lifting assemblies corresponding to the second plurality of channels in the plurality of base assemblies.

9. The apparatus of claim 1, wherein the wing is a rotatable wing.

10. A lifting system to lift a rotatable wing away from a fuselage of an aircraft, the lifting system comprising:
    a plurality of lifting assemblies configured to be attached to a first plurality of channels in a ring associated with the rotatable wing of the aircraft in which a lifting assembly in the plurality of lifting assemblies comprises a lifting bracket having a member configured to extend through a channel in the first plurality of channels and a cap configured to engage the member to secure the lifting bracket to the channel in the ring;
    a plurality of base assemblies configured to be attached to a plurality of fittings with a second plurality of channels associated with the fuselage of the aircraft in which a base assembly in the plurality of base assemblies comprises a base structure having a cavity configured to receive a fitting in the plurality of fittings, a plate configured to be connected to the base structure such that the base assembly is connected to the fitting, and a number of fasteners configured to connect the plate to the base structure;
    a plurality of hydraulic lift units configured to move the plurality of lifting assemblies away from the plurality of base assemblies such that the ring moves away from the fuselage;
    a hydraulic pump configured to be attached to the plurality of hydraulic lift units and to send fluid into the plurality of hydraulic lift units to move the plurality of lifting assemblies away from the plurality of base assemblies such that the ring moves away from the fuselage;
    a plurality of measurement units configured to measure a displacement between the plurality of lifting assemblies and the plurality of base assemblies; and
    a locking system configured to reduce a rotation of the ring while the plurality of lifting assemblies is attached to the first plurality of channels in the ring associated with the rotatable wing of the aircraft, the plurality of base assemblies is attached to the plurality of fittings with the second plurality of channels associated with the fuselage of the aircraft, and the first plurality of channels is aligned with the second plurality of channels in which the locking system comprises a plurality of pins configured to be placed through the first plurality of channels attached to the plurality of lifting assemblies corresponding to the second plurality of channels in the plurality of base assemblies.

11. A method for moving a wing, the method comprising:
    attaching a plurality of lifting assemblies to a first plurality of channels in a ring associated with the wing of an aircraft;
    attaching a plurality of base assemblies to a plurality of fittings with a second plurality of channels associated with a fuselage of the aircraft while the first plurality of channels is unaligned with the second plurality of channels in the plurality of fittings associated with the fuselage of the aircraft; and
    moving the plurality of lifting assemblies away from the plurality of base assemblies using a plurality of biasing systems such that the ring moves away from the fuselage.

12. The method of claim 11 further comprising:
rotating the ring to align the first plurality of channels in the ring associated with the wing of the aircraft with the second plurality of channels in the plurality of fittings associated with the fuselage of the aircraft.

13. The method of claim 11, wherein a lifting assembly in the plurality of lifting assemblies comprises:
a lifting bracket having a member configured to extend through a channel in the first plurality of channels; and
a cap configured to engage the member to secure the lifting bracket to the channel in the ring.

14. The method of claim 11, wherein a base assembly in the plurality of base assemblies comprises:
a base structure having a cavity configured to receive a fitting in the plurality of fittings; and
a plate configured to be connected to the base structure such that the base assembly is connected to the fitting.

15. The method of claim 14, wherein the base assembly further comprises:
a number of fasteners configured to connect the plate to the base structure.

16. The method of claim 11, wherein the plurality of biasing systems comprises:
a plurality of hydraulic lift units.

17. The method of claim 16, wherein a hydraulic pump is configured to be attached to the plurality of hydraulic lift units and to send fluid into the plurality of hydraulic lift units to move the plurality of lifting assemblies away from the plurality of base assemblies such that the ring moves away from the fuselage.

18. A method for lifting a wing away from a fuselage of an aircraft using a wing lift system, the method comprising:
rotating a ring associated with the wing of the aircraft to align a first plurality of channels in the ring with a second plurality of channels in a plurality of fittings associated with the fuselage of the aircraft;
attaching a plurality of lifting assemblies to the first plurality of channels in the ring associated with the wing of the aircraft while the first plurality of channels is unaligned with the second plurality of channels in the plurality of fittings associated with the fuselage of the aircraft in which a lifting assembly in the plurality of lifting assemblies comprises a lifting bracket having a member configured to extend through a channel in the first plurality of channels and a cap configured to engage the member to secure the lifting bracket to the channel in the ring;
attaching a plurality of base assemblies to the plurality of fittings with the second plurality of channels associated with the fuselage of the aircraft while the first plurality of channels is unaligned with the second plurality of channels in the plurality of fittings associated with the fuselage of the aircraft in which a base assembly in the plurality of base assemblies comprises a base structure having a cavity configured to receive a fitting in the plurality of fittings; a plate configured to be connected to the base structure such that the base assembly is connected to the fitting; and a number of fasteners configured to connect the plate to the base structure; and
moving the plurality of lifting assemblies away from the plurality of base assemblies using a plurality of hydraulic lift units such that the ring moves away from the fuselage in which a hydraulic pump is configured to be attached to the plurality of hydraulic lift units and to send fluid into the plurality of hydraulic lift units to move the plurality of lifting assemblies away from the plurality of base assemblies such that the ring moves away from the fuselage.

\* \* \* \* \*